(12) United States Patent
Yeung et al.

(10) Patent No.: US 7,606,769 B2
(45) Date of Patent: Oct. 20, 2009

(54) SYSTEM AND METHOD FOR EMBEDDING USER AUTHENTICATION INFORMATION IN ENCRYPTED DATA

(75) Inventors: Michael Yeung, Mission Viejo, CA (US); Sameer Yami, Irvine, CA (US); Amir Shahindoust, Laguna Niguel, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 661 days.

(21) Appl. No.: 11/248,037

(22) Filed: Oct. 12, 2005

(65) Prior Publication Data

US 2007/0143210 A1 Jun. 21, 2007

(51) Int. Cl.
*G06Q 99/00* (2006.01)
(52) U.S. Cl. .......................................... 705/51; 705/50
(58) Field of Classification Search ......... 713/168–181; 380/259–269, 277–286; 705/50–51
See application file for complete search history.

(56) References Cited

U.S. PATENT DOCUMENTS

| | | | | |
|---|---|---|---|---|
| 5,544,245 | A * | 8/1996 | Tsubakiyama | 713/171 |
| 5,796,830 | A * | 8/1998 | Johnson et al. | 380/286 |
| 5,815,573 | A * | 9/1998 | Johnson et al. | 380/286 |
| 6,049,612 | A | 4/2000 | Fielder et al. | |
| 6,363,154 | B1 * | 3/2002 | Peyravian et al. | 380/283 |
| 6,510,519 | B2 * | 1/2003 | Wasilewski et al. | 713/168 |
| 6,567,794 | B1 * | 5/2003 | Cordery et al. | 705/60 |
| 6,973,671 | B1 * | 12/2005 | Hsing et al. | 726/8 |
| 7,221,762 | B2 * | 5/2007 | Gentry et al. | 380/268 |
| 2002/0071565 | A1 * | 6/2002 | Kurn et al. | 380/281 |
| 2002/0126840 | A1 | 9/2002 | Robbins et al. | |
| 2003/0021417 | A1 | 1/2003 | Vasic et al. | |

FOREIGN PATENT DOCUMENTS

| WO | WO 9627155 | * | 9/1996 |
|---|---|---|---|
| WO | WO-99/17495 | | 4/1999 |

OTHER PUBLICATIONS

Phillips, Ken, RecoverKey unlocks data. (technical view of Trusted Information Systems' key-recovery technology), Sep. 15, 1997, PC Week, v14, n39, p. 138(2).*

* cited by examiner

*Primary Examiner*—Calvin L Hewitt, II
*Assistant Examiner*—James D Nigh
(74) *Attorney, Agent, or Firm*—Tucker Ellis & West LLP

(57) ABSTRACT

The present invention is directed to a system and method for secure document transmission. The method begins by receiving first and second key portions into a data storage associated with a document processing device. The first key portion suitably includes data representing a user of the document processing device and the second key portion suitably includes data representing a source of at least one electronic document directed for transmission to the document processing device. Next, at least one encrypted electronic document is received into the document processing device, wherein the document includes the second key portion. The received electronic document is then decrypted using the second key portion and the first key portion, which was retrieved from the data storage. Following decryption, a document processing operation is commenced on the decrypted electronic document.

12 Claims, 3 Drawing Sheets

SYSTEM AND METHOD FOR EMBEDDING USER AUTHENTICATION INFORMATION IN ENCRYPTED DATA

BACKGROUND OF THE INVENTION

This invention is directed to a method and system for secure document transmission. More particularly, this invention is directed to a method and system for registering a user and identifying a document associated with an encrypted electronic document and transmitted to a document processing device over a computer network.

In typical office settings, a computer network generally includes document processing devices, such as printers, copiers, facsimile machines, and scanning devices, which employ little to no inherent data security. Thus, a registered user of the computer network, for example, generally has physical access to each device, thereby enabling the user to access the files being print, faxed or stored on the device. In addition, as document processing requests are transmitted over the computer network, an authorized user has little to no trouble in intercepting such transmissions, either intentionally or accidentally, and viewing the contents thereof. To maintain confidentiality of document data, passwords, usernames, biometrics, and the like, are implemented at the document processing device, thereby preventing even authorized users from viewing the pending processing requests of another user. However, the encryption techniques employed by any such network still leave accessible the document data as it transits the computer network, enabling a user or users to view the data prior to the document processing device receiving and securely storing it. Furthermore, document data transmitted from a user to the document processing device is generally a plain text file, or other non-encrypted data stream, which when intercepted by another user, does not protect the document from unwanted viewing.

The subject invention overcomes the aforementioned problems and provides a method and system for secure document transmission.

SUMMARY OF THE INVENTION

In accordance with the present invention, there is provided a system and method for the secure transmission of electronic document data on a network.

Further in accordance with the present invention, there is provided a system and method for identifying a document from authentication data embedded in a header associated with an encrypted document processing request.

Still further, in accordance with the present invention, there is provided a system and method for identifying a user associated with a document processing request containing an encrypted electronic document.

In accordance with the present invention, there is provided a system for secure document transmission. The system includes receiving means adapted to receive first and second key portions into a data storage associated with a document processing device. The first key portion suitably includes data representing the user of the document processing device and the second key portion suitably includes data representing the source of at least one electronic document directed for transmission to the document processing device. The system further includes receiving means adapted to receive at least one encrypted electronic document into the document processing device where the at least one encrypted electronic document includes the second key portion. The system of the present invention also includes decryption means adapted to decrypt a received electronic document using the second key portion, which was included with the document, and the first key portion, which was retrieved from the data storage. In addition, the system includes commencement means adapted to commence a document processing operation on a decrypted electronic document.

In one embodiment, the first and second key portions are received along with an initial document transmission from a user of the document processing device. Subsequent documents from the same user then need only include the second key portion.

Further in accordance with the present invention, there is provided a method for secure document transmission. The method begins by receiving first and second key portions into a data storage associated with a document processing device. The first key portion suitably includes data representing a user of the document processing device and the second key portion suitably includes data representing a source of at least one electronic document directed for transmission to the document processing device. Next, at least one encrypted electronic document is received into the document processing device, wherein the document includes the second key portion. The received electronic document is then decrypted using the second key portion and the first key portion, which was retrieved from the data storage. Following decryption, a document processing operation is commenced on the decrypted electronic document.

In one embodiment, the first key and the second key portions are received along with an initial document transmission from a user of the document processing device. Each subsequent encrypted document sent from the same user need only include the second key portion.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for secure transmission of electronic document data on a network. In particular, the present invention is directed to a system and method for identifying a document from authentication data contained in a header associated with an encrypted document processing request. More particularly, the present invention is directed to a system and method for identifying a user associated with a document processing request containing an encrypted electronic document. Preferably, the document processing device is a multifunctional peripheral device, capable of providing scanning, copying, facsimile, printing, document management, document storage, electronic mail, and other functions to a user.

Figure 1:
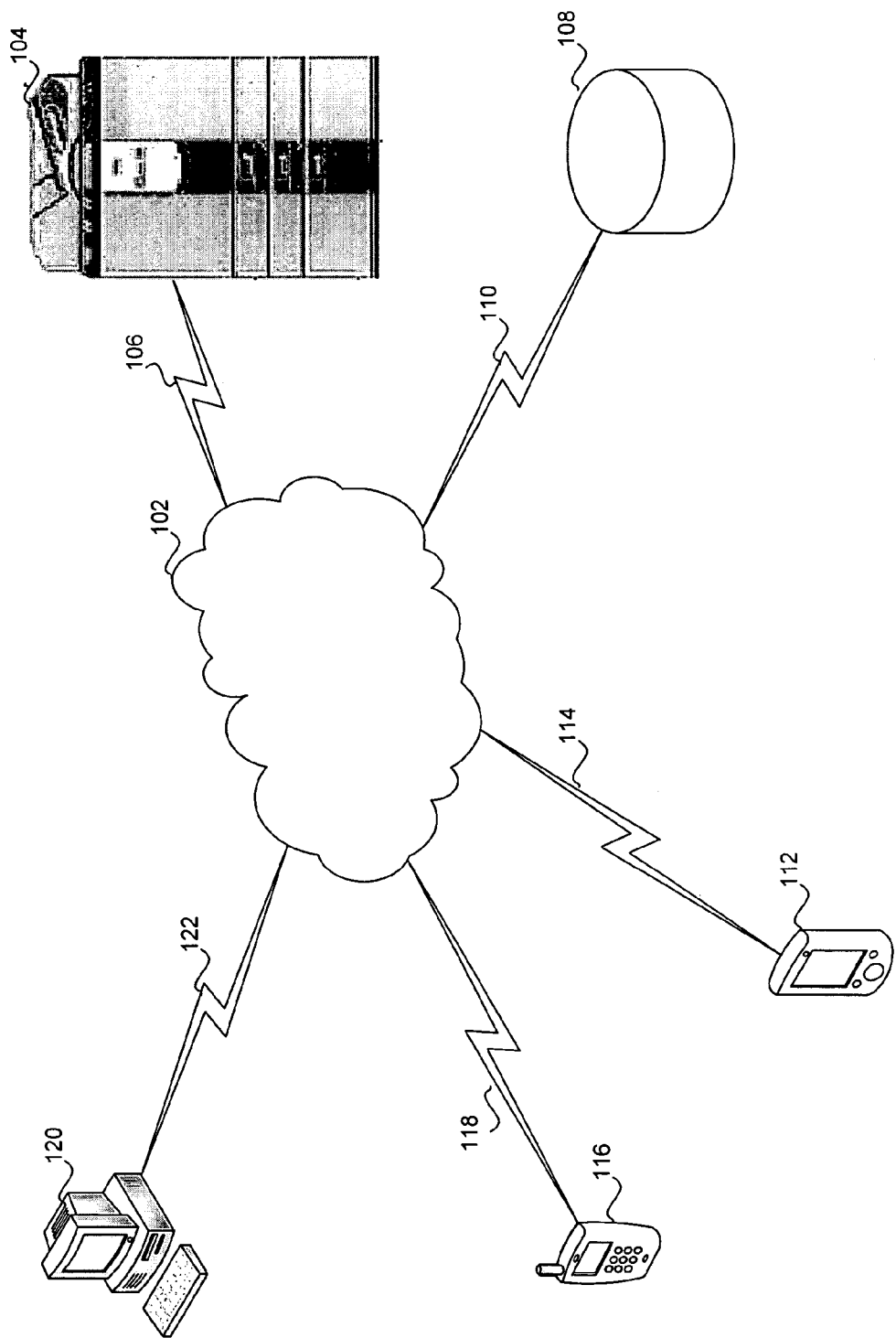
FIG. 1 is a block diagram illustrative of the system of the present invention.

Turning now to FIG. 1, there is shown a system 100 in accordance with the present invention. As shown in FIG. 1, the system 100 suitably includes a computer network 102. It will be appreciated by those skilled in the art that the computer network 102 is any computer network, known in the art, which is capable of enabling the communication of data between two or more electronic devices. As the skilled artisan will appreciate, the present invention is capable of incorporation on any such computer network including, for example and without limitation, Ethernet, local area network, wide area network, personal area network, Token Ring, the Internet, intranets, and the like. In the preferred embodiment, the present invention is employed over a corporate, or local area network. The skilled artisan will appreciate that the present invention is equally capable of being employed on a wide area network, a wireless local area network, the Internet, and the like. In one embodiment, the computer network 102 is suitably equipped with administratively-enabled security protocols, such as unique user identification/password combinations, to control access to the computer network 102 and any associated electronic devices connected thereto.

The system 100 further includes a document processing device 104, communicatively coupled to the network 102 via a suitably communications link 106. It will be appreciated by those skilled in the art the document processing device 104 is advantageously represented in FIG. 1 as a multifunction peripheral device, suitably adapted to provide a variety of document processing services, such as, for example and without limitation, scanning, copying, facsimile, printing, and the like. Suitable commercially available image generating devices include, but are not limited to, the Toshiba e-Studio Series Controller. In one embodiment, the document processing device 104 is suitably equipped to receive a plurality of portable storage media, including without limitation, Firewire, MMC, XD, Compact Flash, Memory Stick, and the like. The communications link 106 is any suitable channel of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art.

As shown in FIG. 1, the system 100 also includes a storage location 108, in data communication with the computer network 102 via a suitable communications link 110. As will be appreciated by those skilled in the art, the storage location 108 is any mass storage system known in the art capable of receiving, retrieving, storing and managing data. In the preferred embodiment, the central storage location 108 is any mass data storage device known in the art, for example and without limitation, an integrated magnetic hard drive or other dynamic or static memory storage device, e.g., flash memory. The communications link 110 is any suitable means of data communication known in the art including, for example and without limitation, wired data communications channels, Bluetooth, WiMax, 802.11a, 802.11b, 802.11g, 802.11(x), infrared, optical, or any suitable wireless data transmission system.

The system 100 also includes a plurality of client devices, illustrated in FIG. 1 as a personal data assistant 112, a smart phone 116, and a desktop computer 120. It will be appreciated by those skilled in the art that the present invention does not require three client devices, but rather is capable of allowing any number of client devices, greater than or less than three, to be used in accordance with the present invention. The personal data assistant 112 is suitably equipped to communicate with the computer network 102 via the communications link 114. As will be understood by those skilled in the art, the communications link 114 is representative of a plurality of communications channels which the personal data assistant 112 is capable of using to exchange data with the network 102. Thus, for example and without limitation, the communications link 114 is any wired or wireless data communications channel known in the art, such as Bluetooth, WiMax, 802.11a, 802.11b, 802.11g, 802.11(x), infrared, optical, and the like. The smart phone 116 of the system 100 is suitably adapted to communicate with the computer network 102 using the communications link 118. In accordance with the present invention, the communications link 118 is advantageously a wireless communications channel, such as, for example and without limitation, a cellular-telephonic connection. It will be understood by those skilled in the art that the smart phone 116 is any web-enabled telephonic device known in the art and capable of communicating with other personal electronic devices. The desktop computer 120 is representative of personal computers and laptop computers, which are capable of data communication with the computer network 102. The desktop computer 120 exchanges data with the computer network 102 via a suitable communications link 122. It will be appreciated by those skilled in the art that the type of communications link employed by the computer 120 is dependent upon the network interface card of the computer 120, including wired and wireless compliant cards. The communications link 122 is any suitable means of data communication known in the art enabling the transmission and receipt of electronic data including, without limitation, Ethernet, Bluetooth, WiMax, 802.11a, 802.11b, 802.11g, 802.11(x), infrared, optical, and the like.

In operation, the client devices 112, 116, and 120 are capable of transmitting document processing requests to the document processing device 104 over the computer network 102. For secure transmission, i.e., so other client devices cannot eavesdrop on the transmissions, a client device is equipped, in accordance with the present invention, to securely transmit an encrypted document file containing user and document identification data. For brevity, the personal data assistant 112 will be used in the following example, however the remaining client devices 116 and 120 are equally capable of employing the techniques described below. Thus, when a user of the personal data assistant 112 requires a document processing operation be performed on a given document, and also requires a greater degree of confidentiality than is generally associated with document processing requests, the user, via a client driver operating on the client device 112 initiates a secure document processing request.

The client device first generates a random symmetric encryption key, which is used to encrypt the electronic document. Preferably, a random symmetric encryption key is generated each time a secure document processing request is initiated. A symmetric password key is then generated and used to encrypt the random symmetric encryption key. The password key is then divided into two shares. When requesting secure document processing operations for the first time, both shares are sent to the document processing device 104, with the first share being stored in the storage location 108 for future secure document processing operations from the user. The first share is used for registration of the user and subsequent identification of the user, while the second share is sent to identify the document as originating from the particular user. Authentication information, both existing and new, e.g., user identification, domain information, user key information, etc., are suitably embedded into a header. When this request is the first request, both the first share and the second share are added to the authentication information of the header. When this is a subsequent request, only the second share is added to the header, as the first share is accessible to the document processing device from the storage location 108. The header is then encrypted using the public key of the document processing device 104 and added to the encrypted document data. Following encryption, the secure document processing request containing the header and document data is sent the associated document processing device 104.

From the server, or document processing device, side, the document processing device 104 receives a secure document processing request containing an encrypted header and an encrypted electronic document. The document processing device 104 decrypts the encrypted header using the document processing device 104 private key to retrieve the second share, or both the second and first shares, if this is the first time the client device 112 has submitted a secure document processing request. When it is not the first secure document processing request from the client device 112, the document processing device 104 retrieves the first share from the storage location 108 the first share stored at the storage location 108 is accessible only when the user enters an associated network domain user-identification/password at the document processing device 104. It will be appreciated by those skilled in the art that each user on the network 102 has a distinct and separate network domain user-identification/password, which is entered at the document processing device 104 prior to accessing the first share corresponding to that particular user. In an alternate embodiment, the user-identification/password is a local user-identification/password suitably authenticated by an associated authentication server communicatively coupled to the document processing device 104. In either event, the first share and the second share are combined to generate the password key, which was used to encrypt the electronic document. The document processing device then decrypts the random symmetric encryption key using the password key. The decrypted random symmetric encryption key is then used to decrypt the electronic document data, whereupon the document processing device 104 performs the document processing operation associated with the secure document processing request. It will be appreciated by those skilled in the art that further usage of timestamps and the decryption of document encryption keys establish the uniqueness of the document that the user has encrypted. The foregoing system will better be understood by those skilled in the art when viewed in conjunction with the flowcharts described in FIGS. 2 and 3.

Figure 2:
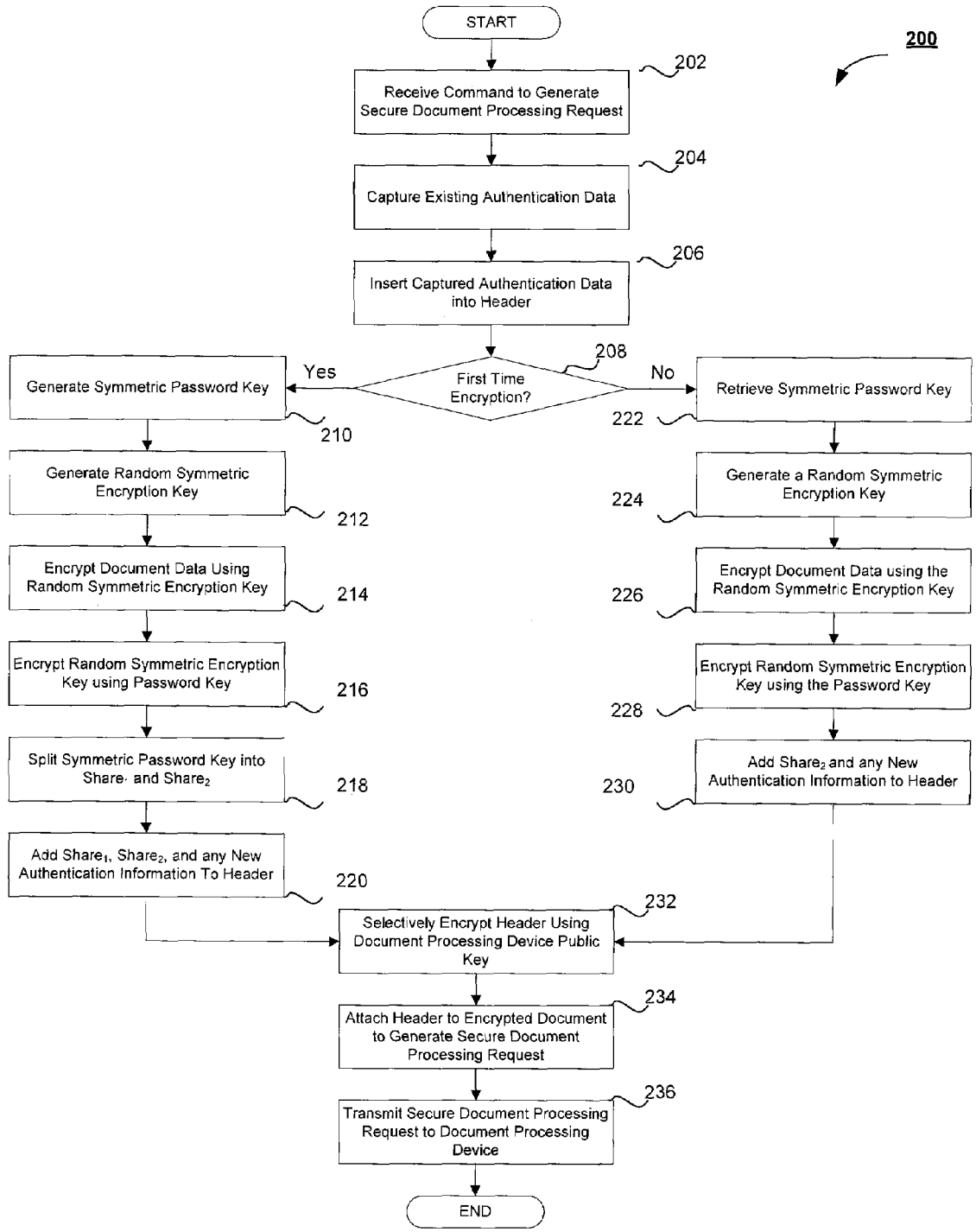
FIG. 2 is a flowchart illustrating a client side method according to the present invention.

Turning now to FIG. 2, there is shown a flowchart 200 illustrating the client side of the present invention for secure document transmission. Beginning at step 202, the client device 112 receives a secure document processing request command. It will be understood by those skilled in the art that the client device 112 suitably includes a client driver adapted to facilitate the encryption and formation of the secure document processing request. The skilled artisan will further appreciate that the term "client driver" is used to describe an application running on the client device 112 which facilitates the operation of the subject method. The client driver then captures existing authentication data from the client device 112 regarding the user at step 204. Preferably, the existing authentication data suitably includes, but is not limited to, a user-ID, domain/realm data, user Kerberos® ticket information, user public key(s), static symmetric key(s), static mobile code(s), shared symmetric key(s), any other trust related information, and the like or any suitable combination thereof. It will be appreciated by those skilled in the art that the foregoing listing is not exhaustive of trust information that the client driver is adapted to capture. Furthermore, the skilled artisan will appreciate that one or more of the items in the aforementioned listing are only captured if applicable to the client device 112, the network 102, the domain, the server, and/or the associated document processing device 104.

Once the designated authentication information has been gathered, flow proceeds to step 206, wherein the client driver inserts the captured authentication data into a header associated with the secure document processing request. A determination is then made at step 208 as whether the current secure document processing request represents the first secure document processing request initiated by the user. When the current secure document processing request is the first such request, flow proceeds to step 210, wherein a symmetric password key is generated. It will be appreciated by those skilled in the art that the symmetric password key is a randomly generated encryption key based, in part, on a user password. Other methods, as will be appreciated by the skilled artisan, for generating the symmetric password key are equally capable of being employed by the present invention, without departing from the scope of the instant claims. At step 212, a random symmetric encryption key is generated via any means known in the art. The electronic document associated with the secure document processing request is then encrypted at step 214 using the symmetric encryption key to generate encrypted electronic document data. The symmetric encryption key is then encrypted at step 216 using the password key. The encrypted symmetric encryption key is then included in the subsequent transmission of the secure document processing request to the document processing device 104.

Next, flow proceeds to step 218, wherein the symmetric password key is split into a first share ($Share_1$) and a second share ($Share_2$). In the preferred embodiment, the splitting of a key into multiple parts is accomplished using a Blakeley-Shamir secret splitting scheme, however those skilled in the art will appreciate that the present invention is not limited to such a scheme and any other splitting method known in the art that is equally sufficient to divide the password key into $Share_1$ and $Share_2$. In accordance with a preferred embodiment of the present invention, the associated client device 112 advantageously retains a locally stored copy of the password key, $Share_1$, and $Share_2$. At step 220, $Share_1$, $Share_2$, and any additional authentication data is added to the header. As will be appreciated by those skilled in the art, the additional authentication data is suitably capable of including, but is not limited to, newly generated authentication information, public keys, private keys, symmetric keys, e.g., the random symmetric encryption key encrypted using the password key, and the like. The skilled artisan will further appreciate that the inclusion of the header enables the document itself to function as a carrier of user authentication information.

Following inclusion of $Share_1$, $Share_2$, and the additional, if any, authentication information, flow proceeds to step 232, wherein the header is encrypted using a public encryption key corresponding to the designated document processing device 104. The header is then attached to the encrypted electronic document at step 234 to form the complete secure document processing request. The secure document processing request is then transmitted to the document processing device 104 at step 236 for document processing.

Returning to step 208, when the requested secure document processing request is not the first such request submitted by the user, e.g., client device 112, flow proceeds to step 222. At step 222, the client device 112 retrieves the symmetric password key from the corresponding password file. Preferably, the password key is stored in a file on the client device 112 in accordance with the file management system employed thereon regarding secure data files. Those skilled in the art will appreciate that protection of the password key is suitably accomplished using secure file storage means as are known in the art. A random symmetric encryption key is then generated at step 224 via any means known in the art. The electronic document data is then encrypted at step 226 using the generated symmetric encryption key. The random symmetric encryption key is then encrypted at step 228 using the retrieved password key. It will be appreciated by those skilled in the art that the encrypted random symmetric encryption key is suitably included in the subsequent transmission of the secure document processing request to the document processing device 104, preferably embedded in the header affixed thereto. $Share_2$ and any additional authentication information are then added to the header at step 230. Preferably, the client device 112 suitably retrieves $Share_2$ from an associated local storage for insertion into the header, as set forth at step 230. As this request represents a subsequent secure document processing request, it will be appreciated by those skilled in the art that the $Share_1$ is already stored on the storage location 108.

The header containing the authentication data, $Share_2$, and the additional authentication information is then selectively encrypted using the public key of the document processing device 104 at step 232. It will be understood by those skilled in the art that the client device 112 suitably gains access to the public key of the document processing device 104 upon the installation of the client driver, automatically from the document processing device 104 when it is added to the network 102, or alternatively, by a system administrator. The header is then attached to the encrypted document at step 234 to generate a secure document processing request. The secure document processing request is then sent to the document processing device 104 at step 236 for completion of the requested document processing operations.

Figure 3:
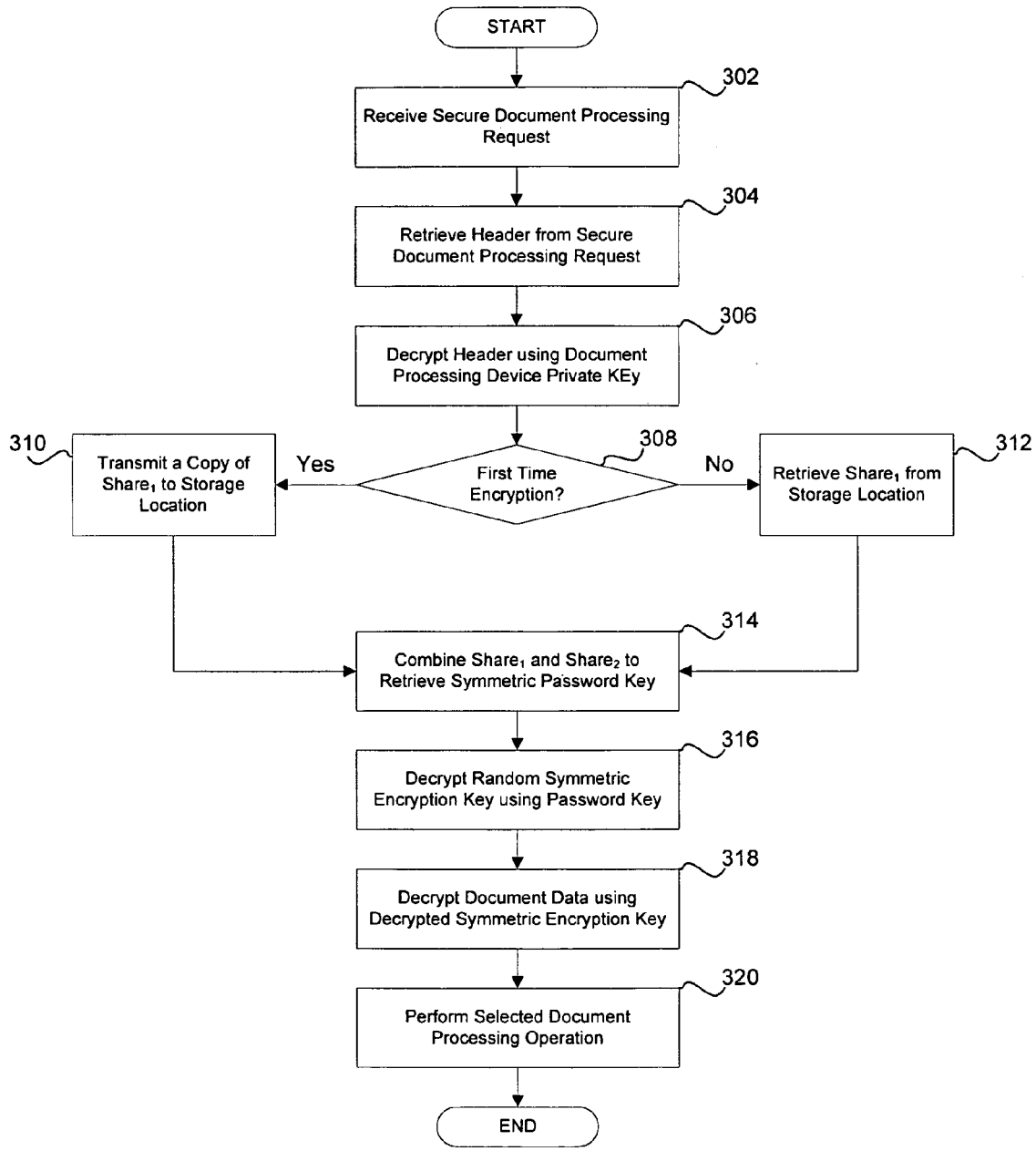
FIG. 3 is a flowchart illustrating a server side method according to the present invention.

Referring now to FIG. 3, there is shown a flowchart 300 illustrating the server side of the present invention for secure document transmission. The flowchart 300 begins at step 302 when the document processing device 104 receives a secure document processing request. The header accompanying the request is then retrieved at step 304. Using the document processing device private key, the header is decrypted at step 306 to retrieve $Share_2$ and authentication data. When this is the first secure document processing request received from a particular user, as determined at step 308, the header also includes $Share_1$, a copy of which is transmitted at step 310 to the storage location 108 for future use by the document processing device 104, following a successful authentication of the user at the device 104, while temporarily retaining the original for further decryption use. As will be appreciated by those skilled in the art, the document processing device 104, upon receipt of authentication information input by an associated user, authenticates the user against a mutually trusted authentication server. Suitable authentication servers include, but are not limited to, Kerberos KDC, Active Directory, internally embedded authentication server, and the like. $Share_1$ and $Share_2$ are then combined at step 314 to retrieve the symmetric password key with which the symmetric encryption key used to encrypt the electronic document was encrypted. The password key is then used, at step 316, to decrypt the symmetric encryption key with which the electronic document data was encrypted. The document data is then decrypted at step 318 using the recovered symmetric encryption key. The document processing device 104 then performs the requested document processing operation on the decrypted electronic document at step 320.

Returning to step 308, when a determination is made that the received secure document processing request is a subsequent request, i.e., the document processing device 104 has received at least one previous secure document processing request from the same user (client device 112), flow proceeds to step 312, where the document processing device 104, after a successful authentication of the user at the document processing device 104, retrieves $Share_1$ from the storage location 108. Following retrieval of $Share_1$ from the storage location 108, the document processing device 104 combines $Share_1$ with $Share_2$, which was included in the secure document processing request, and generates the symmetric password key at step 314. The password key is then used at step 316 to decrypt the symmetric encryption key that was used to encrypt the electronic document data. At step 318, the received encrypted document data is decrypted by the document processing device 104 using the recovered symmetric encryption key. The document processing device 104 then outputs the decrypted document in accordance with the secure document processing request at step 318. It will be appreciated by those skilled in the art that the subject invention uses $Share_1$ for user identification and $Share_2$ to identify the document, to which it is affixed, as originating from the user.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for secure document transmission comprising:
   a processor;

a memory storing computer readable instructions which when executed by the processor cause the processor to perform the steps of:

receiving, with an initial encrypted electronic document transmission to a document processing device, an encrypted key into a data storage associated with the document processing device, which key has first and second key portions, the second key portion being associated with source data corresponding to a source of at least the initial electronic document directed for transmission to the document processing device;

decrypting the encrypted key;

extracting the first key portion from the decrypted key;

storing the extracted first key portion in a data storage of the document processing device associatively with the source data corresponding thereto;

receiving at least a second encrypted electronic document into the document processing device, wherein the electronic document includes an encrypted header including the second key portion without the first key portion;

receiving login data at the document processing device;

extracting the second key portion from the second electronic document by decrypting, via the computer, the header of the second encrypted electronic document at the document processing device using a private key;

identifying a user via an association of the second key portion decrypted from the header with the first key portion data in the data storage corresponding thereto and received login data;

decrypting a received electronic document inclusive of identification thereof using a reconstructed symmetric key formed by combining the second key portion from the decrypted header and the first key portion retrieved from the data storage corresponding to an output of the identifying means;

commencing a document processing operation on a decrypted electronic document from the decrypting means; and generating an output document from the document processing device based on the document processing operation and the decrypted electronic document.

2. The system for secure document transmission of claim 1, wherein the means for receiving the first and second key portions include means for receiving the first and second key portions along with an initial document transmission from a user of the document processing device, wherein the means for receiving include means for receiving a subsequent document from the user which such document need only include the second key portion.

3. The system for secure document transmission of claim 2, wherein the first key portion and the second key portion are derived from a symmetric key.

4. The system for secure document transmission of claim 2, wherein the header further includes authentication data.

5. A method for secure document transmission to a document processing device comprising the steps of:

receiving, with an initial encrypted electronic document transmission to a document processing device, an encrypted key into a data storage associated with the document processing device, which key has first and second key portions, the second key portion being associated with source data corresponding to a source of at least the initial electronic document directed for transmission to the document processing device;

decrypting the encrypted key in a computer having a processor operating in conjunction with associated memory;

extracting, via the computer, the first key portion from the decrypted key;

storing the extracted first key portion in a data storage of the document processing device associatively with the source data corresponding thereto;

receiving at least a second encrypted electronic document into the document processing device, wherein the electronic document includes an encrypted header including the second key portion without the first key portion;

receiving login data at the document processing device;

extracting the second key portion from the second electronic document by decrypting, via the computer, the header of the second encrypted electronic document at the document processing device using a private key;

identifying, at the document processing device, a user via an association of the second key portion decrypted from the header with the first key portion data in the data storage corresponding thereto and received login data;

decrypting, via the computer, a received electronic document inclusive of identification thereof using a reconstructed symmetric key formed by combining the second key portion from the decrypted header and the first key portion retrieved from the data storage corresponding to an output of the identifying;

commencing a document processing operation on the decrypted electronic document at the document processing device; and generating an output document from the document processing device based on the document processing operation and the decrypted electronic document.

6. The method for secure document transmission of claim 5, wherein the first and second key portions are received along with an initial document transmission from a user of the document processing device, wherein the step of receiving at least one encrypted electronic document includes receiving a subsequent document from the user, wherein such document need only include the second key portion.

7. The method for secure document transmission of claim 6, wherein the first key portion and the second key portion are derived from a symmetric key.

8. The method for secure document transmission of claim 7, wherein the header further includes authentication data.

9. A computer-readable medium encoded with a computer program which when executed causes a computer to perform the steps of:

receiving, with an initial encrypted electronic document transmission to a document processing device, an encrypted key into a data storage associated with the document processing device, which key has first and second portions, the second key portion being associated with source data corresponding to a source of at least the initial electronic document directed for transmission to the document processing device;

decrypting the encrypted key;

extracting the first key portion from the decrypted key;

storing the extracted first key portion in a data storage of the document processing device associatively with the source data corresponding thereto;

receiving at least a second encrypted electronic document into the document processing device, wherein the electronic document includes an encrypted header including the second key portion without the first key portion;

receiving login data;

extracting the second key portion from the second electronic document by decrypting, via the computer, the header of the second encrypted electronic document at the document processing device using a private key;

identifying a user via an association of the second key portion decrypted from the header with the first key portion data in the data storage corresponding thereto and received login data;

decrypting, via the computer, a received electronic document inclusive of identification thereof using a reconstructed symmetric key formed by combining the second key portion from the decrypted header and the first key portion retrieved from the data storage corresponding to an output of the identifying;

commencing a document processing operation on the decrypted electronic document; and generating an output document from the document processing device based on the document processing operation and the decrypted electronic document.

10. The computer-readable medium encoded with a computer program for secure document transmission of claim 9, wherein the receiving first and second key portions include receiving first and second key portions along with an initial document transmission from a user of the document processing device, wherein the receiving at least one encrypted electronic document includes receiving a subsequent document from the user, wherein such document need only include the second key portion.

11. The computer-readable medium encoded with a computer program for secure document transmission of claim 10, wherein the first key portion and the second key portion are derived from a symmetric key.

12. The computer-readable medium encoded with a computer program for secure document transmission of claim 10, wherein the first key portion and the second key portion are derived from a symmetric key.

* * * * *